United States Patent [19]

Straehle et al.

[11] Patent Number: 4,698,410

[45] Date of Patent: Oct. 6, 1987

[54] PROCESS FOR THE PREPARATION OF HIGH-TEMPERATURE-RESISTANT DENSE OR CELLULAR POLYURETHANE ELASTOMERS

[75] Inventors: Wolfgang Straehle, Heidelberg; Matthias Marx, Bad Durkheim; Uwe Schuett, Obergriesbach, all of Fed. Rep. of Germany

[73] Assignee: BASF Aktiengesellschaft, Ludwigshafen, Fed. Rep. of Germany

[21] Appl. No.: 878,632

[22] Filed: Jun. 26, 1986

[30] Foreign Application Priority Data

Jul. 24, 1985 [DE] Fed. Rep. of Germany ....... 3526413

[51] Int. Cl.⁴ ............................................. C08G 18/38
[52] U.S. Cl. ......................................... 528/76; 528/77; 528/78; 528/81; 528/83; 528/85
[58] Field of Search .................... 528/76, 77, 78, 81, 528/83, 85

[56] References Cited

U.S. PATENT DOCUMENTS

| | | | |
|---|---|---|---|
| 2,822,349 | 2/1958 | Muller et al. | 260/75 |
| 3,294,751 | 12/1966 | Beitschman | 260/75 |
| 3,804,812 | 4/1974 | Koroscil | 260/77.5 |
| 4,374,209 | 2/1983 | Rowlands et al. | 260/77.5 |
| 4,523,025 | 6/1985 | Cuscurida et al. | 560/26 |
| 4,546,121 | 10/1985 | Haas et al. | 521/164 |

*Primary Examiner*—Maurice J. Welsh
*Attorney, Agent, or Firm*—John C. Demeter; D. Barbara McKenzie-Wardell

[57] ABSTRACT

The invention relates to a process for preparing high temperature-resistant dense or cellular polyurethane elastomers by reacting the following, preferably using low-pressure processing techniques:

(a) organic polyisocyanates, preferably in the form of isocyanate group-containing prepolymers and/or modified urethane group-containing organic polyisocyanates, with
(b) relatively high molecular weight compounds having at least 2 reactive hydrogen atoms,
(c) urea derivatives and, optionally,
(d) chain extenders and/or cross-linking agents in the presence of
(e) catalysts and, optionally,
(f) blowing agents
(g) auxiliaries and/or additives wherein amino and/or hydroxyl group-substituted ureas and/or polyureas having molecular weights from 200 to 4000 are also used as the urea derivatives. Said ureas and/or polyureas are prepared by reacting organic diisocyanates with primary aliphatic and/or cycloaliphatic diamines and/or alkanolamines in molar ratios of from 1:1.1 to 1:2, preferably in the presence of polyester or polyether polyols as solvents or diluting agents.

10 Claims, No Drawings

PROCESS FOR THE PREPARATION OF HIGH-TEMPERATURE-RESISTANT DENSE OR CELLULAR POLYURETHANE ELASTOMERS

BACKGROUND OF THE INVENTION

1. Field of Invention

Polyurethane elastomers are used as sole materials in industrial safety shoes. Compared with rubber, these products offer better wear resistance. However, at relatively low temperatures they begin to soften or melt. For this reason, the use of polyurethane soles has been restricted to normal industrial safety shoes.

The high temperature dimensional stability of polyurethane elastomers could be improved by using aromatic diamines instead of diols as the chain extenders. Polyurethane elastomer systems containing diamine, however, can only be processed in high-pressure RIM equipment. Polyurethane based shoe soles are currently produced almost exclusively using the low-pressure process.

2. Description of Prior Art

The preparation of dense or cellular polyurethane elastomers by reacting organic polyisocyanates with organic polyhydroxyl compounds in the presence of catalysts and optionally chain extenders and/or cross-linking agents as well as blowing agents, auxiliaries, and/or additives is known in the art. If the hydroxyl group-containing polyesters, polyethers, polyester amides, etc., and organic polyisocyanates are correctly selected and when chain extenders such as glycols, trifunctional alcohols, and/or diamines are used, both elastic and rigid, optionally cellular polyurethane elastomers as well as all intermediate modifications can be prepared by known methods.

The preparation of polyurethane elastomers, their mechanical properties, and uses is described, for example, in the monographs *Polyurethanes*, Parts I and II, Vol. XVI, of *High Polymers*, by I.H. Saunders and K.C. Frisch (New York: Interscience Publishers, 1962 and 1964) and *Polyurethane*, Vol. VII of *Kunststoff-Handbuch*, Ed. R. Vieweg and A. Höchtlen, G. Oertel (Munich: Carl Hanser Verlag, 1966, 1983).

According to DE No. A-831 604 (U.S. Pat. No. 2,778,810), isocyanate group-containing prepolymers are first prepared from the hydroxyl group-containing, relatively high molecular weight compounds and organic polyisocyanates. These prepolymers are then reacted in a second step with the chain extenders, e.g., diols or diamines, to form high molecular weight elastomers.

Diamines cannot generally be used in a one-shot process. However, the development of high-pressure RIM techniques has permitted the preparation of optionally cellular, elastic molded articles possessing a dense surface of polyurethane-polyurea elastomers by reacting a one-shot system, which essentially comprised organic polyisocyanates, polyols, aromatic diamines and/or polyamines whose amino groups were stearically hindered by ortho-positioned alkyl substituents, and a strong catalyst for the reaction between the hydroxyl and isocyanate groups, in a closed mold. Such processes are described, for example, in DE No. A-27-22-951 (U.S. patent No. 4,218,543) and EP Nos. A-26,915 and 69,286.

In addition, EP No. A-19,213 describes the use of low molecular weight aromatic diamines in a special process used to avoid high gas pressures in the preparation of polyurethane elastomers. The added diamines, in combination with glycols and relatively large amounts of water as cross-linking agents and to form carbon dioxide as a blowing agent, produce polyurethane elastomers having a density of from .45 to .8 g/cm$^3$ and improved physical properties at elevated temperatures.

SUMMARY OF THE INVENTION

The objective of the invention was to develop optionally cellular polyurethane elastomers offering improved resistance to high temperatures, which could be used as sole materials for industrial safety shoes and could be processed using low-pressure techniques.

This objective was unexpectedly met by the use of special urea derivatives as a starting component in the preparation of polyurethane elastomers.

Thus, the invention relates to a process for the preparation of dense or cellular polyurethane elastomers by reacting (a) an organic polyisocyanate
(b) a relatively high molecular weight compound having at least two reactive hydrogen atoms and optionally,
(c) an amino and/or nydroxyl group-substituted urea and/or polyurea,
(d) chain extenders and/or cross-linking agents in the presence of,
(e) catalysts, and optionally,
(f) blowing agents
(g) auxiliaries and/or additives The amino and/or hydroxyl group-substituted urea and/or polyurea-containing polyurethane elastomer systems can be processed without difficulty on low-pressure machines, and, compared with conventional elastomers, the resulting polyurethane elastomers exhibit equivalent dimensional stability at approximately 30° C. to 40° C. higher temperatures.

DESCRIPTION OF THE PREFERRED EMBODIMENT

The following can be noted regarding initial components (a) through (c) and (e), optionally (d), (f), and (g) of the process of the invention used to prepare the dense or optionally cellular polyurethane elastomers:

Organic Polyisocyanates

Typical organic polyisocyanates (a) are the essentially known aliphatic, cycloaliphatic, araliphatic, and optionally aromatic polyfunctional isocyanates.

Typical examples are: alkylene diisocyanates having from 4 to 12 carbon atoms in the alkylene radical such as 1,12-dodecane disocyanate, 2-ethyl tetramethylene-1,4-diisocyanate, 2-methyl-1,5-pentamethylene diisocyanate 1,4-tetramethylene diisocyanate, and optionally 1,6-hexamethylene diisocyanate; cycloaliphatic diisocyanates such as 1,3-cyclohexane diisocyanate, and 1,4-cyclohexane diisocyanate, as well as various mixtures of these isomers, 1-isocyanato -3,3,5-isocyantomethylcyclohexane (isophorone diisocyanate), 2,4- and 2,6-hexahydrotoluene diisocyanate as well as corresponding isomer mixrures, 4,4'-, 2,2'-, and 2,4'-dicyclohexylmethane diisocyanate as well as corresponding isomer mixtures, and optionally aromatic di- and polyisocyanates, for example, 2,4- and 2,6-toluene diisocyanate and corresponding isomer mixtures, 4,4'-, 2,4'-, and 2,2'-diphenylmethane diisocyanates, polyphenyl-polymethylene polyisocyanates, mixtures of 4,4'-, 2,4'-, 2,2'-diphenylmethane diisocyanates and polyphenyl-polymethylene polyisocyanate (polymeric MDI) and mixtures of polymeric MDI and toluene diisocyanates. The organic di- and polyisocyanates may be used individually or in the form of mixtures.

Frequently, so-called modified polyfunctional isocyanates are used, i.e. products obtained by chemically reacting the above di-and/or polyisocyanates. Typical examples are ester, urea, biuret, allophanate, carbodiimide, isocyanurate, and/or urethane group-containing di- and/or polyisocyanates. Examples of resultant products include urethane group-containing organic, preferably aromatic polyisocyanates having isocyanate contents of from 15 to 33.6 percent by weight, preferably from 21 to 31 percent by weight, based on the total weight, for example, modified 4,4'-diphenylmethane diisocyanate or modified 2,4- and/or 2,6-toluene diisocyanate. The isocyanates are modified by reacting with low molecular weight diols, triols, dialkylene glycols, trialkylene glycols, or polyoxyalkylene glycols having molecular weights up to 800. Typical examples of the di- or polyoxyalkylene glycols which may be used individually or as mixtures are: diethylene glycol, dipropylene glycol, polyoxyethylene glycol, polyoxypropylene glycol, and polyoxypropylene polyoxyethylene glycol. Isocyanate group-containing prepolymers having isocyanate contents from 9 to 21 percent by weight, preferably from 14 to 21 percent by weight, based on the total weight are also suitable. Said prepolymers may be prepared from the polyether and/or preferably polyester polyols described below and 4,4'-diphenylmethane diisocyanate, mixtures of 2,4'- and 4,4'-diphenylmethane diisocyanate 2,4- and/or 2,6-toluene diisocyanates or polymeric MDI. In addition, liquid carbodiimide group- and/or isocyanurate ring-containing polyisocyanates having isocyanate contents from 15 to 33.6 percent by weight, preferably from 21 to 31 percent by weight. based on the total weight, have also proven to be effective, for example, those based on 4,4'-, 2,4'-, and/or 2,2'-diphenylmethane diisocyanate and/or 2,4 and/or 2,6-toluene diisocyanate.

The modified polyisocyanates may optionally be mixed together or with unmodified organic polyisocyanates such as 2,4'-, 4,4'-diphenylmethane diisocyanate, polymeric MDI, 2,4- and/or 2,6-toluene diisocyanate.

The following have proven to be particularly effective for use as the organic polyisocyanates. Their use is therefore preferred: isocyanate group-containing prepolymers having an isocyanate content from 9 to 25 percent by weighr, more preferably based on polyether or polyester polyols and one or more diphenylmethane diisocyanate isomers, most preferably 4,4'-diphenylmethane diisocyanate and/or modified urethane group-containing organic polyisocyanates having an isocyanate content from 15 to 33.6 percent by weight, most preferably Dased on 4,4'-diphenylmethane diisocyanate or diphenylmethane diisocyanate isomer mixtures.

Higher Molecular Weight Compounds

For the higher molecular weight compounds, component (b), having at least two reactive hydrogen atoms, it has been found desirable to use those having a functionality of from 2 to 8, preferably from 2 to 4, and a molecular weight of from 800 to 8000, preferably from 1200 to 6000. For example, polyether polyamines and/or, preferably, polyols selected from the group comprising polyether polyols, polyester polyols, polythioether polyols, polyester amides, hydroxyl group-containing polyacetals, and hydroxyl group-containing aliphatic polycarbonates or mixtures of at least two of the cited polyols have proven to be effective. Preferably used are polyester polyols and/or polyether polyols.

Suitable polyester polyols may be prepared, for example, from organic dicarboxylic acids having from 2 to 12 carbon atoms, preferably aliphatic dicarboxylic acids having from 4 to 6 carbon atoms, and polyfunctional alcohols, preferably diols, having from 2 to 12 carbon atoms, preferably from 2 to 6 carbon atoms. Typical carboxylic acids which may be used are: succinic acid, glutaric acid, adipic acid, suberic acid, azelaic acid, sebacic acid, decane dicarboxylic acid, maleic acid, and fumaric acid. The dicarboxylic acids may be used individually or as mixtures with one another. Instead of the free dicardoxylic acids, the corresponding dicarboxlic acid derivatives may be used, for example the dicarboxylic acid esters of alcohols having from 1 to 4 carbon atoms or dicarboxYlic anhYdrides. Preferably used are dicarboxylic acid mixtures of succinic, glutaric, and adipic acid in quantitative ratios of, for example, 20–35:35–50:20–32 parts by weight, respectively. More preferably, adipic acid may be used alone. Typical examples of di- and polyfunctional alcohols, preferably diols, are; ethanediol, diethylene glycol, 1,2- and 1,3-propanediol, dipropylene glycol, 1,4-butanediol, 1,5-pentanediol, 1,6-hexanediol, 1,10-decanediol, glycerine, and trimethylolpropane. Preferably used are ethanediol, diethylene glycol, 1,4-butanediol, 1,5-pentanediol, 1,6-hexanediol, or mixtures of at least two of the cited diols, preferably mixtures of 1,4-butanediol, 1,5-pentanediol, and 1,6-hexanediol. In addition, polyester polyols of lactones, for example ϵ-caprolactone, or hydroxylcarboxylic acids, for example ω-hydroxycaproic acid, may be used.

Preferably, the polyester polyols have a functionality of up to 3 and a molecular weight of from 800 to 3000, more preferably from 1200 to 2500, and most preferably from 1800 to 2500.

particularly preferred as polyols are polyether polyols prepared by known methods, for example, anionic polymerization using alkali hydroxides such as sodium hydroxide or potassium hydroxide, or alkali alcoholates such as sodium methylate, sodium or potassium ethylate, or potassium isopropylate as catalysts, or by cationic polymerization using Lewis acids such as antimony pentachloride, borofluoride etherate, etc., or bleaching earth as catalysts, from one or more alkylene oxides having from 2 to 4 carbon atoms in the alkylene radical, and an initiator which contains from 2 to 8, preferably from 2 to 4 reactive hydrogen atoms.

Suitable alkylene oxides are, for example, 1,3-propylene oxide, 1,2-, and 2,3-butylene oxide, styrene oxide, epichlorohydrin, and preferably ethylene oxide and 1,2-propylene oxide. The oxides may be used individually, alternately one after another, or as mixtures. Typical intiators are: water, organic dicarboxylic acids such as succinic acid, adipic acid, phthalic acid, and terephthalic acid, aliphatic and aromatic, optionally N-mono, N,N- and N,N'-dialkylsubstituted diamines having from 1 to 4 carbon atoms in the alkyl radical such as optionally mono- and dialkyl-substituted ethylenediamine, diethylenetriamine, triethylenetetramine, 1,3-propylenediamine, 1,3- respectively 1,4-butylenediamine, 1,2-, 1,3-, 1,4-, 1,5-, and 1,6-hexamethylenediamine, phenylenediamines, 2,4- and 2,6toluenediamine, and 4,4'-, 2,4'-, and 2,2'diaminodiphenylmethane.

Typical initiators are also alkanol amines such as ethanolamine, diethanolamine, N-methyl- and N-ethylethanolamine, N-methyl- and N-ethyldiethanolamine, and triethanolamine, ammonia, hydrazine, and hydrazides. preferably used are polyfunctional, and more preferably di- and/or trifunctional alcohols such as ethanediol, 1,2- and 1,3-propanediol, diethylene glycol, dipropylene glycol, 1,4-butanediol, 1,6-hexanediol, glycerine, trimethyolpropane, pentaerythritol, sorbitol, and sucrose.

The polyether polyols preferably have a functionality of from 2 to 4 and molecular weights from 800 to 8000, more preferably from 1200 to 6000, and most preferably from 1800 to 4000. As with the polyester polyols, they may be used individually or in the form of mixtures. They may also be mixed with the polyester polyols as well as the hydroxyl group-containing polyester amides, polyacetals, polycarbonates, and/or polyether polyamines.

Typical hydroxyl group-containing polyacetals which may be used are compounds produced from glycols such as diethylene glycol, triethylene glycol, 4,4'-dihydroxyethyoxydiphenyldimethylmethane, hexanediol, and formaldehyde. Suitable polyacetals may also be prepared by polymerizinq cyclic acetals.

Hydroxyl group-containing polycarbonares which may be used are those of the essentially known type, which may be prepared, for example, through the reaction of diols such as (1.3)-propanediol, (1,4)-butanediol, and/or (1,6)-hexanediol, diethylene glycol, triethylene glycol, or tetraethylene glycol with diaryl carbonates, for example diphenyl carbonate, or phosgene.

Among the polyester amides which may be used are those from polyfunctional saturated and/or unsaturated carboxylic acids or their anhydrides and polyfunctional saturated and/or unsaturated amino alcohols or mixtures of polyfunctional alcohols and amino alcohols and/or polyamines, preferably linear condensates.

Suitable polyether polyamines may be prepared from the polyether polyols cited aove using known methods. Typical examples are the cyanoalkylation of polyoxyalkylene polyols with the subsequent hydrogenation of the nitrile which is formed (U.S. Pat. No. 3,267,050) or the amination of polyoxyalkylene polyols with amines or ammonia in the presence of hydrogen and catalysts.

Urea Derviatives

The essential characteristic of the invention is the use of amino an/or hydroxyl group-substituted ureas and/or polyureas to prepare the dense and optionally cellular polyurethane elastomers. Suitable ureas and/or polyureas have a molecular weight from 200 to 4000, preferably from 370 to 930. They are prepared by reacting organic, aliphatic, cycloaliphatic, and preferably aromatic diisocyanates with alkanolamines, primary cycloaliphatic and/or preferably, aliphatic diamines in molecular ratios of amine to iisocyanate of preferably 1:1.1 to 1:2.0 more preferably 1:1.5 to 1:2.0.

The unmodified diisocyanates referred to above, which are used to prepare the optionally cellular polyurethanes, typically have proven themselves to be effective for use as organic diisocyanates. The diphenylmethane diisocyanate isomers are preferably used, more preferably 4,4'-diphenylmethane diisocyanate. Suitable alkanolamines have from 2 to 12 carbon atoms in the alkylene radical, preferably from 2 to 10. Typical examples are 1,3-, 1,2-propanolamine, 1,4-butanolamine, 1,5-pentanolamine, 1,6-hexanolamine, 1,8-octanolamine, 1,10-decanolamine, and preferably ethanolamine. The cycloaliphatic and/or preferably aliphatic primary diamines which may be used are those having from 6 to 10, preferably 6 carbon atoms in the optionally alkyl-substituted cyclo alkylene radical, and 2 to 12, preferably 2 to 6 carbon atoms in the linear or branched alkylene radical.

Typical examples are para- or meta-diaminocyclohexane, 1-methyl-2,4- and -2,6-diaminocyclohexane, 1,3-dimethyl-2,4- and -2,6-diaminocyclohexane, 1,3- and 1,2-diominopropane 1,5-diaminopentane, 2-methyl-1,5-diaminopentane, 1,8-diaminooctane, 2-ethyl-1,8-diaminooctane, 1,10-diaminodecane, 1,12-diaminododecane, and preferably 1,2-diaminoethane, 1,4-diaminobutane, and 1,6-diaminohexane. The ureas and/or polyureas of the invention may be prepared through any desired processes. Preferably, though, they are prepared in the polyols suitable for the preparation of polyurethane, especially in rhe above-described polyether or polyester polyols, as solvents for diluting agents, for example at temperatures from 20° to 200° C., preferably from 30° to 60° C. The organic diisocyanates and alkanolamines, cycloalphatic and/or aliphatic diamines, which may be used individually or as mixtures, are best used in such amounts that the resulting solution or dispersion contains from 0.1 to 20 parts by weight, preferably from 0.2 to 1.0 parts by weight amino and/or hydroxyl group-substituted ureas and/or polyureas, based on 100 parts by weight polyol. The resulting solutions or dispersions can be directly reacted to form the polyurethane elastomers or they can be reacted after dilution with relatively high molecular weight compounds containing at least 2 reactive hyrogen atoms, preferably polyols, more preferably polyester and polyether polyols. The amino and/or hydroxyl group-containing ureas and/or polyureas suitable in the invention are preferably used in amounts from 0.01 to 15 parts by weight, more preferably from 0.1 to 2.0 parts by weight and most preferably from 0.5 to 1.0 parts by weight per 100 parts by weight of initial component (b).

Chain Extenders and/or Cross Linking Agents

The dense or cellular polyurethane elastomers may be prepared with or without the use of chain extenders and/or cross-linking agents, component (d). In order to modify the mechanical properties, e.g., hardness, it has been found useful to add chain extenders, cross-linking agents, or optionally mixtures thereof in amounts from 2 to 12 parts by weight, preferably from 4 to 10 parts by weight, based on 100 parts by weight of the (b) component. Diols and/or triols having molecular weights less than 400, preferably from 60 to 300, are used as the chain extenders and/or cross-linking agents. Typical examples are aliphatic, cycloaliphatic, and/or araliphatic diols having from 2 to 14, preferably 4 to 10 carbon atoms, such as ethylene glycol, 1,3-propanediol, 1,10-decanediol, ortho-, meta-, para-dihydroxycyclohexane, diethylene glycol, dipropylene glycol, and preferably 1,4-butanediol, 1,6-hexanediol, and bis(2-hydroxyethyl)hydroquinone, triols such as 1,2,4-, 1,3,5-trihydroxycyclohexane, glycerine, and trimethylolpropane, and low molecular weight hydroxyl group-containing polyalkylene oxides based on ethylene and/or 1,2-propylene oxide and the above-cited diols and/or triols as initiators.

Catalysts

Compounds which have an especially strong accelerating effect on the reaction of the hydroxyl group-containing initial components with the polyisocyanates are preferably used as catalysts, component (e). Organometallic compounds may be used, preferably organic tin compounds such as tin (11) salts of organic carboxylic acids such as tin (11) acetate, tin (11) octoate, tin (11) ethylhexoate, and tin (11) borate, and the dialkyl tin (IV) salts of organic dicarboxylic acids, for example, dibutyl tin diacetate, dibutyl tin dilaurate, dibutyl tin maleate, and dioctyl tin diacetate. The organo-metallic compounds are used alone or, preferably, in combination with highly basic amines. Typical examples are amidines such as 2,3-dimethyl-3,4,5,6-tetrahydropyrimidine, tertiary amines such as triethylamine, tributylamine, dimethylbenzylamine, N-methyl, N-ethyl, N-cyclohexylmorpholine, N,N,N',N'-tetramethylethylenediamine, N,N,N',N'-diaminoethyl ether, bis(-dimethylaminopropyl)urea, dimethylpiperazine, 1,2-dimethylimidazol, 1-azobicyclo(3,3,0)octane and preferably 1,4-diazablcyclo-(2,2,2)octane, and alkanol compounds such as triethanolamine, triisopropanolamine, N-methyl and N-ethyldiethanolamine and dimethylethanolamine.

The following may also be used as catalysts: tris(-dialkylaminoalkyl)-s-hexahydrotriazines, more preferably tris(N,N-dimethylaminopropyl)-s-hexahydrotriazine, tetraalkylammonium hydroxides such as tetramethyl ammonium hydroxide, alkali hydroxides such as sodium hydroxide and alkali alcoholates such as sodium methylate and potassium isopropylate, as well as alkali salts of long-chained fatty acids having from 10 to 20 carbon atoms and optionally hydroxyl groups on the side positions. From 0.001 to 5 percent by weight catalyst or catalyst combination is used based on the weight of component (b), preferably from 0.05 to 2 percent by weight.

Blowing Agents

Among the blowing agents which may optionally be used to prepare the cellular polyurethane elastomers is water, which reacts with the isocyanate groups to form carbon dioxide. The amounts of water which are most effective range from 0.05 to 1 percent based on the weight of the initial component (b), preferably from 0.1 to 0.3 percent by weight.

Other blowing agents which may be used in combination with water are low boiling point liquids which evaporate as a result of the exothermic addition polymerization reaction. Suitable agents are liquids which are inert toward the organic polyisocyanate and which have boiling points less than 100° C. Examples of such preferably used liquids are halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low-boiling point liquids with one another and/or with other sustituted or unsubstituted hydrocarbons may also be used.

The most desirable amount of a low boiling point liquid to be used in preparing the cellular polyurethane elastomers depends on the desired density as well as on the amount of water which is used. In general, amounts from 1 to 10 parts by weight, based on 100 parts by weight of the (e) component, preferably from 2 to 6 parts by weight, produce satisfactory results.

Auxiliaries and/or Additives

Auxiliaries and/or additives (g) may also be incorporated optionally in the reaction mix:ure. TYpical examples are surfactants, fillers, colorants, pigments, flame retardants, release agents, anti-hydrolysis agents, fungistats, and bacteriostats.

Surfactants which may be used are those which aid in homogenizing the initial materials. Typical examples are emulsifiers such as the sodium salts of castor oil sulfates or of fatty acids as well as salts of fatty acids with amines, for example, oleic acid diethylamine or stearic acid diethanolamine, salts of sulfonic acids such as alkali or ammonium salts of dodecylbenzenedisulfonic acid or dinaphthylmethanedisulfonic acid and ricinoleic acid. The surfactants are generally used in amounts from 0.01 to 5 parts by weight, based on 100 parts by weight of component (b).

Among the fillers, in particular reinforcing fillers, are the essentially known organic and inorganic fillers, reinforcing substances, weiqht-increasing substances and substances to improve the wear resistance of paints and coatings. Typical examples of inorganic fillers are silicate minerals, for example, lamellar silicates such as antigorite, serpentine, hornblends, amphibole, chrisotile, talcum, metal oxides such as kaolin. aluminum oxides, titanium oxides, and iron oxides, metal salts such as chalk, heavy spar; and inorganic pigments such as cadmium sulfide, zinc sulfide, as well as powdered asbestos. preferably used are kaolin (China Clay), aluminum silicate, and coprecipitates of barium sulfate and aluminum silicate, as well as natural and synthetic fibrous minerals like asbestos and wollastonite. Typical organic fillers which may be used are coal, melamine, pine resin, cyclopentadienyl resins, and graft polymers based on styrene acrylonitrile prepared by in situ polymerization of acrylonitrile styrene mixtures in polyether polyols as descrioed in German patents Nos. 11 11 394, 12 22 669 (U.S. Pat No.3,304,273; 3,383,351; 3,523,093); No. 11 52 536 (GB No. 1,040,452); No. and 11 52 537 (GB No. 987,618), which may then optionally be aminated. Other organic fillers which can be used include polyoxyalkylene polyols or filler polyolyoxyalkylene polyamines, where aqueous polymer dispersions are converted to polyoxyalkylene polyol dispersions.

The inorganic and organic fillers may be used individually or in the form of mixtures. Preferably, stable filler polyoxyalkylene polyol dispersions are used in which the fillers are reduced to a particle size less than 7 µm in situ in the presence of polyoxyalkylene polyols by means of high localized energy densities and are dispersed at the same time; or styrene-acrylonitrile graft polymers are used.

The inorganic and/or organic fillers are incorporated in the reaction mixture, preferably in amounts from 0.5 to 50 percent by weight, more preferably from 1 to 40 percent by weight, based on the weight of components (a) through (c).

Further information on the additional auxiliaries and additives as cited above may be found in the technical literature, for example in J. H. Saunders and K. C. Frisch. *polyurethanes Chemistry and Technology, Part I Chemistry; Part II Technoloqy*. Parts 1 and 2, vol. 16, of *High Polymers* (New York: lnterscience Publishers. 1962, 1964); or *Polyurethane*, vol. 7 of *Kunststoff Handbuch*, 1st and 2nd eds. (Munich: Carl Hanser Verlag, 1966, 1983).

Process of the Invention

To prepare the polyurethane elastomers, the organic polyisocyanates, component (a), the relatively high molecular weight compounds having at least two reactive hydrogen atoms, component (b), and the amino and/or hydroxyl group-substituted ureas and/or polyureas component (c), and optionally chain extenders and/or cross-linking agents, component (d), are reacted in such amounts that the equivalent ratio of isocyanate groups in the polyisocyanate, component (a), to the sum of reactive hydrogen atoms in components (b) and (c) and optionally (d) is 1:0.85 to 1:1.25, preferably 1:0.95 to 1:1.15, and more preferably 1:0.98 to 1.05.

The polyurethane elastomers are prepared using a prepolymer or one-shot process, preferably with the aid of known low-pressure processing techniques by charging the reaction mixture into an open mold, which may be closed after filling in order to achieve the desired green strength in the molded article.

When using a mixing chamber having several feed nozzles, the system components may be fed in individually and mixed intensively in the mixing chamer. It has been found to be particularly desirable to use a two-component process and to dissolve the substituted ureas and/or polYureas, component (c), and the chain extenders and/or cross-linking agent, component (d), in the higher molecular weight compounds, component (b), having at least two reactive hydrogen atoms and to combine them with the catalysts, component (e), optional blowing agents, component (f), as well as optional auxiliaries and additives, component (g), in component (A) and to use the organic polyisocyanates (a) preferably the modified organic polyisocyanates and/or isocyanate group-containing prepolymers as component (B). One advantage of this in processing is that the two main components only need to be mixed together in the appropriate amounts.

The amount of reaction mixture fed into the mold is established such that the dense polyurethane elastomers have a density of from 0.9 to 1.4 g/cm$^3$, preferablY from 1.0 to 1.2 g/cm$^3$, whereby optionally cellular elastomers may be formed, for example by the gases trapped in the reaction mixture, in particular air, or through the use of moisture in components (b) through (d), and the cellular polyurethane elastomers, which are obtained by adding controlled amounts of water or water and inert physical blowing agents, have a density of from 0.3 to 0.8 g/cm$^3$, preferably from 0.45 to 0.70 g/cm$^3$. Tne initial components are fed into the mold at temperatures from 15° to 70° C., preferably from 20° 60° C. The mold is preferably constructed of metallic materials and is temperature-controlled. The temperature of the mold is generally from 20° to 90° C., preferably from 25° to 65° C. lt may optionally be advantageous to use conVentional mold release agents, for example those based on waxes or silicone, in order to improve demolding. The degrees of compression used in the preparation of molded articles from cellular polyurethane elastomers are between 1.1 and 10, preferably between 2 and 6.

The dense polyurethane elastomers obtained with the process of the invention are suitable for use in the automobile industry, for example as bumper covering materials and body parts such as fenders, spoilers, and wheelhouse flairs, as well as engineering housings and rollers. The cellular polyurethane elastomers are used, for example, as armrests, headrests, safety cushioning materials in automotive interiors, as well as motorcycle and bicycle saddles, seat cushions, cover layers in foam laminates, and, in particular at densities from 0.30 to 0.70 g/cm$^3$, as shoe soles.

The parts cited in the Examples refer to parts by weight.

EXAMPLE 1

Preparation of an amino group-containing urea. While stirring at room temperature mix:
- 100 parts by weight of a butanediol 1,4-ethylene glycol polyadipate having a hydroxyl number of 56 and
- 0.50 part by weight (0.0043 mole) 1,6-hexamethylenediamine.

The mixture was heated at 50° C. until the diamine had completely dissolved. 0.546 parts by weight (0.00216 moles) 4,4'-diphenylmethane diisocyanate were added at this temperature and stirring was continued for one hour to complete the reaction. Then the reaction mixture was allowed to cool.

EXAMPLE 2

Preparation of a hydroxyl group-containing urea. The same procedure as used in Example 1 was followed, however, instead of 1,6-hexamethylenediamine, 1.0 parts by weight (0.0112 mole) 2-amino-2-methyl-1-propanol and 1.405 parts by weight (0.0056 mole) 4,4'-diphenylmethane diisocyanate were used.

EXAMPLE 3

Preparation of a cellular polyurethane elastomer.
A Component: mixture of:
- 88 parts by weight of the urea polyester polyol mixture of Example 1
- 8.95 parts by weight ethylene glycol
- 0.08 parts by weight water
- 0.17 parts by weight foam stabilizer based on a silicone oil
- 1.0 parts by weight triethylenediamine (33 percent solution in ethylene glycol) and
- 1.8 parts by weight trichlorotrifluoroethane B Component: Isocyanate group-containing prepolymer having an isocyanate content of 18.7 parts by weight, prepared by reacting 65 parts by weight 1,4-butanediol ethylene glycol polyadipate (hydroxyl number 56) with 100 parts by weight 4,4'-diphenylmethane diisocyanate.

One hundred parts by weight of the A Component and 92 parts by weight of the B Component, corresponding to an isocyanate index of 100, were mixed at 40° C. with the aid of a low-pressure metering machine.

Two hundred sixty parts of the resulting reaction mixture was charged into a 45° C. temperature-controlled metal mold whose dimensions were 10×200×200 mm and allowed to cure in the closed mold. The mold residence time was 30 seconds.

The following mechanical properties were measured on the resulting test plaque:

| | | |
|---|---|---|
| Density | (g/cm$^3$) | 0.65 |
| Dimensional stability at elevated temperature* | (°C.) | 162 |
| Tensile strength | (N/mm$^2$) | 15.8 |
| Tear strength (Graves) | (N/mm) | 13.7 |
| Elongation | (%) | 450 |

-continued

| Hardness | (Shore A) | 76 |

*Modulus of torsional elasticity measured at T' (≙N/mm²); the temperature was measured at which the torsional modulus curve intersects the 10° line.

EXAMPLE 4

Preparation of a cellular polyurethane elastomer.

A Component: As in Example 3, but substituting the urea polyester polyol mixture prepared in Example 2 for that of Example 1.

B Component: As in Example 3. One hundred parts by weight of the A Component and 98 parts by weight of the B Component, corresponding to an isocyanate index of 100, were processed into test plaques as in Example 3. The mold residence time was 300 seconds.

The following mechanical properties were observed in the resulting test plaque:

| Density | (g/cm³) | 0.65 |
| Dimensional stability at elevated temperature* | (°C.) | 152 |
| Tensile strength | (N/mm²) | 10.0 |
| Tear strength (Graves) | (N/mm) | 13.7 |
| Elongation | (%) | 460 |
| Hardness | (Shore A) | 77 |

*Modulus of torsional elasticity measured at T' (≙N/mm²); the temperature was measured at which the torsional modulus curve intersects the 10° line.

COMPARISON EXAMPLE 1

A Component: As in Example 3, but a 1,4-butanediol ethylene glycol polyadipate having a hydroxyl number of 56 was used instead of the urea polyester polyol mixture.

B Component: As in Example 3. One hundred parts by weight of the A Component and 98 parts by weight of the B Component, corresponding to an isocyanate index of 100, were processed into test plaques as in Example 3. The mold residence time was 300 seconds.

The following mechanical properties were observed in the resulting test plaque:

| Density | (g/cm³) | 0.65 |
| Dimensional stability at elevated temperature* | (°C.) | 130 |
| Tensile strength | (N/mm²) | 11.0 |
| Tear strength (Graves) | (N/mm) | 14.0 |
| Elongation | (%) | 420 |
| Hardness | (Shore A) | 75 |

*Modulus of torsional elasticity measured at T' (≙N/mm²); the temperature was measured at which the torsional modulus curve intersects the 10° line.

The embodiments of the invention in which an exclusive property or privilege is claimed are defined as follows:

1. A process for the preparation of cellular or noncellular polyurethane elastomers comprising reacting
   (a) an organic polyisocyanate,
   (b) a high molecular weight compound having at least two reactive hydrogen atoms, and
   (c) an amino and/or hydroxyl group substituted diurea and/or polyurea having a molecular weight of from 200 to 400 ; and optionally
   (d) a chain extender and/or cross-linking agent; in the presence of:
   (e) a catalyst and, optionally in the presence of
   (f) a blowing agent, and
   (g) an auxiliary and/or an additive.

2. The process of claim 1 wherein the amino and/or hydroxyl group-substituted urea and/or polyurea component (c) is used in amounts from 0.01 part to 15 parts by weight based on 100 parts by weight of the relatively high molecular weight compound having at least two reactive hydrogen atom components (b).

3. The process of claim 1 wherein the amino and/or hydroxyl group-substituted urea and/or polyurea has a molecular weight of from 370 to 930 and is prepared by reacting an organic diisocyanate with a primary aliphatic and/or cycloaliphatic diamine and/or alkanolamine.

4. The process of claim 1 wherein the amino and/or hydroxyl group-substituted urea and/or polyurea has a molecular weight of from 370 to 930 and is prepared by reacting on organic diisocyanate with a primary aliphatic and/or cycloaliphatic diamine having 2 to 12 carbon atoms in the (cyclo)alkylene radical and/or alkanolamine having 2 to 12 carbon atoms in the alkylene radical in a molecular ratio of 1:1.1 to 1:2.

5. The process of claim 1 wherein the amino and/or hydroxyl group-substituted urea and/or polyurea has a molecular weight from 370 to 930 and is prepared by reacting an organic diisocyanate with a primary aliphatic and/or cycloaliphatic diamine having 2 to 12 carbon atoms in the (cyclo)alkylene radical and/or alkanolamine in the presence of a polyester or a polyether polyol.

6. The process of claim 1 wherein
   (i) a polyisocyanate group-containing prepolymer has an isocyanate content of from 25 percent to 9 percent by weight based on the total weight, and/or
   (ii) a modified urethane group-containing organic polyisocyanate having an isocyanate content of from 33.6 percent ro 15 percent by weight, based on the total weight.
   is used as the organic polyisocyanate (a).

7. The process of claim 1 wherein a polyether and/or a polyester polyol having a functionality of from 2 to 4 and a molecular weight of from 1200 to 6000 is used as the relatively high molecular weight compound having at least two reactive hydrogen atoms, component (b).

8. The process of claim 1 wherein water is used as the blowing agent for the preparation of the cellular polyurethane elastomers in amounts of from 0.05 parts by weights to 1.0 parts by weight per 100 parts by weight of component (b).

9. The process of claim 1 wherein the cellular or noncellular polYurethane elastomer is prepared by a low-pressure method.

10. A polyurethane elastomer shoe sole having a density of from 0.30 to 0.70 g/cm³ prepared by the process of claim 1.

* * * * *

UNITED STATES PATENT AND TRADEMARK OFFICE
CERTIFICATE OF CORRECTION

PATENT NO. : 4,698,410
DATED : October 6, 1987
INVENTOR(S) : WOLFGANG STRAEHLE ET AL It is certified that error appears in the above-identified patent and that said Letters Patent is hereby corrected as shown below:

Column 12, line 3: The numerical value 400 should read 4000.

Signed and Sealed this

Twenty-second Day of March, 1988

Attest:

DONALD J. QUIGG

Attesting Officer          Commissioner of Patents and Trademarks